(12) United States Patent
Komaki et al.

(10) Patent No.: US 11,055,503 B2
(45) Date of Patent: Jul. 6, 2021

(54) METHOD FOR READING FROM RFID-TAGGED ARTICLE AND RFID SYSTEM

(71) Applicant: Murata Manufacturing Co., Ltd., Nagaokakyo (JP)

(72) Inventors: Kunihiro Komaki, Nagaokakyo (JP); Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/433,083

(22) Filed: Feb. 15, 2017

(65) Prior Publication Data

US 2017/0161531 A1 Jun. 8, 2017

Related U.S. Application Data

(63) Continuation of application No. PCT/JP2015/072380, filed on Aug. 6, 2015.

(30) Foreign Application Priority Data

Aug. 21, 2014 (JP) .............................. JP2014-168273

(51) Int. Cl.
*G06K 7/10* (2006.01)
*H04B 5/00* (2006.01)
(Continued)

(52) U.S. Cl.
CPC ..... *G06K 7/10445* (2013.01); *G06K 7/10316* (2013.01); *H01Q 1/2216* (2013.01);
(Continued)

(58) Field of Classification Search
None
See application file for complete search history.

(56) References Cited

U.S. PATENT DOCUMENTS 8,009,118 B2 * 8/2011 Son ...................... H01Q 1/2225
343/806
9,905,931 B2 * 2/2018 Kilian ..................... H01Q 9/30
(Continued)

FOREIGN PATENT DOCUMENTS

CN 102195135 A 9/2011
CN 102820536 A 12/2012
(Continued)

OTHER PUBLICATIONS

Official Communication issued in corresponding International Application PCT/JP2015/072380, dated Sep. 1, 2015.
(Continued)

*Primary Examiner* — Adolf Dsouza
(74) *Attorney, Agent, or Firm* — Keating & Bennett, LLP

(57) ABSTRACT

In a method for reading from an RFID-tagged article and an RFID system, information is accurately read from an RFID tag while interference with other devices is prevented by use of a compact and simple configuration. An article is conveyed on a conveyor belt. Also, an RFID tag is attached to the article. Information on the RFID tag is read by a leaky coaxial cable that is a stationary read/write antenna in a vicinity of the conveyor belt. The leaky coaxial cable is above the conveyor belt and at least a portion of the cable traverses the conveyor belt.

14 Claims, 8 Drawing Sheets

(51) Int. Cl.
  *H01Q 1/22* (2006.01)
  *H01Q 13/20* (2006.01)

(52) U.S. Cl.
  CPC ......... *H01Q 13/203* (2013.01); *H04B 5/0018* (2013.01); *H04B 5/0062* (2013.01)

(56) References Cited

U.S. PATENT DOCUMENTS

| 2007/0279191 A1 | 12/2007 | Yamamoto et al. |
| 2011/0199920 A1 | 8/2011 | Takei et al. |
| 2014/0158766 A1 | 6/2014 | Paske et al. |

FOREIGN PATENT DOCUMENTS

| JP | 08-288735 A | | 11/1996 |
| JP | 2004-192222 A | | 7/2004 |
| JP | 2004-352436 A | | 12/2004 |
| JP | 2005-020360 A | | 1/2005 |
| JP | 2006-041572 A | | 2/2006 |
| JP | 2007-243821 A | | 9/2007 |
| JP | 2007243821 | * | 9/2007 |
| JP | 2007-312177 A | | 11/2007 |
| JP | 2009-069956 A | | 4/2009 |
| JP | 2009 077310 | * | 4/2009 |
| JP | 2009-077310 A | | 4/2009 |
| JP | 2009-146104 A | | 7/2009 |
| JP | 2009-282662 A | | 12/2009 |
| JP | 2012-253574 A | | 12/2012 |
| JP | 2014-115994 A | | 6/2014 |

OTHER PUBLICATIONS

Official Communication issued in corresponding Japanese Patent Application No. 2015-550507, dated Oct. 25, 2016.
Official Communication issued in corresponding Japanese Patent Application No. 2015-550507, dated Jan. 24, 2017.
Official Communication issued in corresponding Chinese Patent Application No. 201580043991.4, dated Jul. 18, 2018.

* cited by examiner

CONVEYING DIRECTION

CONVEYING DIRECTION

METHOD FOR READING FROM RFID-TAGGED ARTICLE AND RFID SYSTEM

CROSS REFERENCE TO RELATED APPLICATIONS

This application claims the benefit of priority to Japanese Patent Application No. 2014-168273 filed on Aug. 21, 2014 and is a Continuation Application of PCT Application No. PCT/JP2015/072380 filed on Aug. 6, 2015. The entire contents of each application are hereby incorporated herein by reference.

BACKGROUND OF THE INVENTION

1. Field of the Invention

The present invention relates to a method for reading from an RFID-tagged article and, more particularly, to a method for reading from an RFID-tagged article such that information is read from an RFID tag attached to an article conveyed in one direction by using a stationary RW antenna in a vicinity thereof.

The present invention also relates to an RFID system and, more particularly, to an RFID system including a stationary RW antenna disposed in a vicinity of an RFID tag attached to an article conveyed in one direction so as to read information thereof.

2. Description of the Related Art

Recently, an RFID management system is used in some cases for logistics management and process management. In this system, information of RFID tags attached to articles conveyed on a belt is read with a stationary RW antenna disposed in the vicinity of the belt.

In this case, if the orientations of the conveyed articles are not uniform, i.e., if the positions and orientations of the RFID tags are not aligned, the information of the RFID tags cannot accurately be read. Therefore, for example, as disclosed in JP 2009-282662 A, an RFID reader device capable of switching a direction of polarization of the RW antenna may be used.

Additionally, electromagnetic waves radiated from the RW antenna may affect other devices or may be affected by other devices. Therefore, for example, as disclosed in JP 2014-115994 A, a reading area may be covered with a tunnel type electromagnetic wave shielding body.

Although these techniques enable the device to accurately read information of RFID tags while preventing interference with other devices, the device is inevitably complicated and increased in size and cost. Alternatively, as disclosed in JP 2004-352436 A, JP 2005-020360 A, or JP 2009-146104 A, a plurality of antennas may be arranged to surround the belt. However, a plurality of antennas must be used for constituting a reading area all over the belt. Since these antennas are disposed close to each other, problems of interference, etc. occur and, therefore, the on/off control of the antennas must be provided in a synchronized manner so as to avoid the interference. Thus, as is the case with the above description, the device is inevitably complicated and increased in size and cost.

SUMMARY OF THE INVENTION

Therefore, preferred embodiments of the present invention provide a method for reading from an RFID-tagged article and an RFID system such that information is accurately read from an RFID tag while interference with other devices is prevented by use of a compact and simple configuration.

A method for reading from an RFID-tagged article according to a preferred embodiment of the present invention is a method for reading from an RFID-tagged article in which information is read from an RFID tag attached to an article conveyed in one direction by using a stationary RW antenna disposed in a vicinity thereof, wherein the stationary RW antenna is a cable-shaped traveling-wave antenna, and at least a portion of the traveling-wave antenna traverses a conveying direction of the article so as to read information from the RFID tag by using an electromagnetic field around the traveling-wave antenna.

Preferably, the cable-shaped traveling-wave antenna wraps around the article.

Preferably, at least two portions of the cable-shaped traveling-wave antenna traverse the conveying direction of the article.

More preferably, the cable-shaped traveling-wave antenna meanders with respect to the conveying direction of the article or is helically disposed around the conveying direction of the article.

Preferably, a leading end portion side of the cable-shaped traveling-wave antenna is located downstream along the conveying direction of the article.

Preferably, a downstream side of the cable-shaped traveling-wave antenna is brought closer to the article as compared to an upstream side along the conveying direction of the article.

An RFID system according to a preferred embodiment of the present invention is an RFID system including a conveyor platform conveying an article to which an RFID tag is attached in one direction and a stationary RW antenna disposed in a vicinity of the conveyor platform so as to read information from the RFID tag attached to the article, wherein the stationary RW antenna is a cable-shaped traveling-wave antenna, and at least a portion of the traveling-wave antenna traverses a conveying direction of the article.

Preferably, the cable-shaped traveling-wave antenna wraps around the conveyor platform.

Preferably, at least two portions of the cable-shaped traveling-wave antenna traverse the conveying direction of the article.

More preferably, the cable-shaped traveling-wave antenna meanders with respect to the conveying direction of the article or is helically disposed around the conveyor platform.

Preferably, a leading end portion of the cable-shaped traveling-wave antenna is located downstream along the conveying direction of the article.

Preferably, a downstream side of the cable-shaped traveling-wave antenna is brought closer to the article as compared to an upstream side along the conveying direction of the article.

Since the stationary RW antenna is a cable-shaped traveling-wave antenna represented by a leaky cable, only the area close to the line defined by the cable is used as a radiation area, i.e., a tag readable area. This traveling-wave antenna generates a roughly uniform electromagnetic field around the traveling-wave antenna and does not substantially generate a standing wave. By disposing the antenna as described above such that at least a portion thereof transverses the belt, information is able to be accurately read from the RFID tag while interference with other devices is prevented by use of a compact and simple configuration.

Particularly, the absence of the occurrence of an interference problem between multiple antennas eliminates the need for a complicated control circuit to control antennas, etc., so that the RFID system is able to have a simple structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
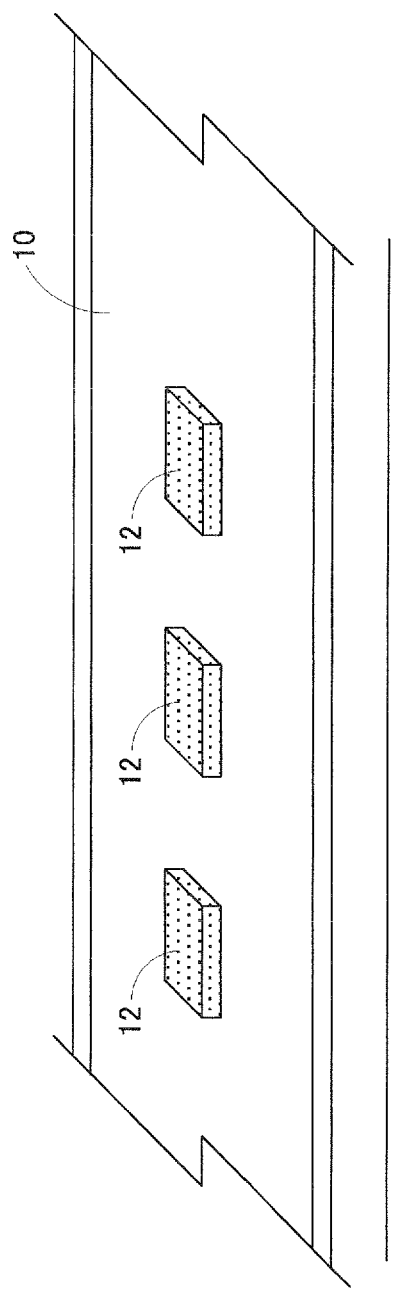
FIG. 1 is a perspective view of an example of a belt of an RFID system according to a preferred embodiment of the present invention and articles conveyed by the belt.
Figure 2:
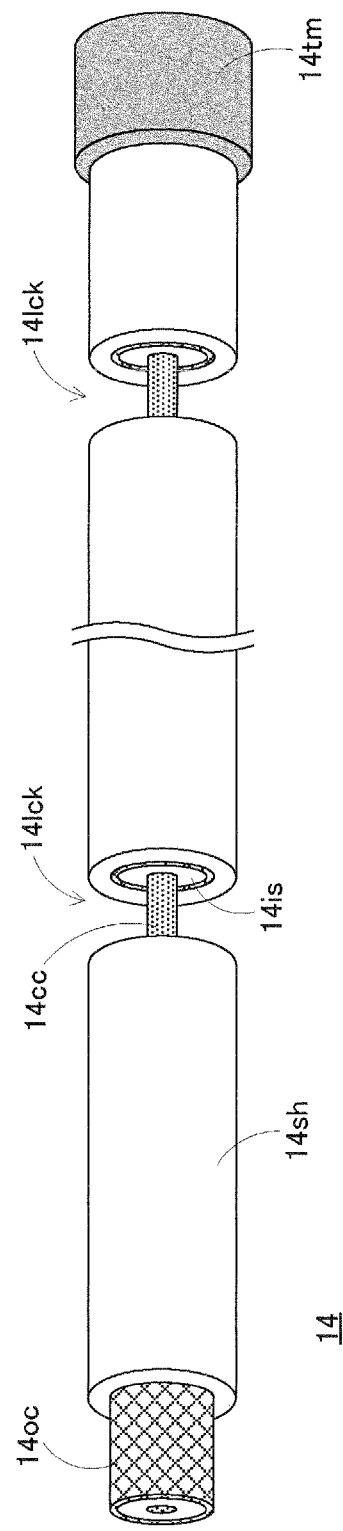
FIG. 2 is an external view of an example of a leaky coaxial cable of an RFID system according to a preferred embodiment of the present invention.
Figure 3:
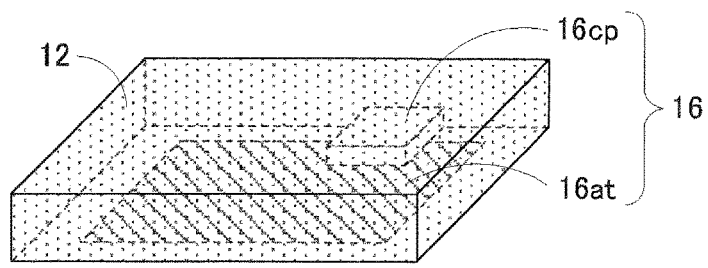
FIG. 3 is an illustrative view of an example of an article and an RFID tag embedded in an article.

Referring to FIGS. 1 to 3, an RFID system of the present preferred embodiment preferably is a UHF-band RFID system using the UHF band as a carrier frequency and includes a conveyor platform (conveyor belt 10) conveying articles 12 to which RFID tags 16 are attached in one direction, and a leaky coaxial cable 14 radiating electromagnetic waves. The leaky coaxial cable 14 is fixedly disposed above the conveyor belt 10 so as to read tag information from the RFID tags 16 or to write tag information on the RFID tags 16 (details will be described later). Therefore, the leaky coaxial cable 14 is used as a stationary RW antenna in the RFID system of this preferred embodiment.

It is noted that "RW" of the stationary RW antenna stands for a reader/writer and means either one or both of a "reader (read)" and a "writer (write)." Each of the articles 12 is, for example, a printed wiring board including a plurality of chip components (not shown) including an RFIC element 16cp mounted on a surface layer or an inner layer, and is conveyed on the conveyor belt 10 to carry into and out of a reflow furnace etc. This printed wiring board has the RFIC element 16cp built-in, and a ground electrode provided in or on the inner layer of the printed wiring board is used as an antenna element 16at, so that the RFID tag 16 includes the RFIC element 16cp and the antenna element 16. An RFID reader device (not shown) is connected to the leaky coaxial cable 14, and a high frequency signal to be the source of radiated electromagnetic waves is supplied by this RFID reader device to the leaky coaxial cable 14.

A structure of the leaky coaxial cable 14 is shown in FIG. 2. The leaky coaxial cable 14 preferably is a cable-shaped traveling-wave antenna, is a flexible cable antenna including a connection end portion for a reader/writer and a leading end portion, and is freely bendable along an extending direction thereof. The leaky coaxial cable 14 has a cross section defining a circle perpendicular or substantially perpendicular to the extending direction. A center conductor (core wire) 14cc is embedded in the center of the perfect circle. An insulator 14is, an outer conductor (external conductor) 14oc, and a sheath 14sh are provided in this order on the outer circumference of the center conductor 14cc. A material of the center conductor 14cc and the outer conductor 14oc is copper, the material of the insulator 14is is polyethylene foam, and the material of the sheath 14sh is flame-retardant polyethylene. The center conductor 14cc is a signal line and the outer conductor 14oc is a ground of metal wire woven into a mesh.

A terminator 14tm is provided on a terminal end of the leaky coaxial cable 14. The center conductor 14cc is continuously provided over the entire length of the leaky coaxial cable 14, while the insulator 14is, the outer conductor 14oc, and the sheath 14sh are omitted at intervals of a predetermined length to define missing portions 141ck. Therefore, the leaky coaxial cable 14 has missing portions 141ck at intervals of the predetermined length, and the center conductor 14cc is exposed to the outside at these missing portions 141ck.

As described above, the leaky coaxial cable 14 preferably is used as a stationary RW antenna, and the leaky coaxial cable 14 defines and functions as a cable-shaped traveling-wave antenna. In other words, the leaky coaxial cable 14 is regarded as an example of a cable-shaped traveling-wave antenna. The cable-shaped traveling-wave antenna is also referred to as a traveling wave type cable antenna and is a cable antenna using traveling waves.

Figure 4A:
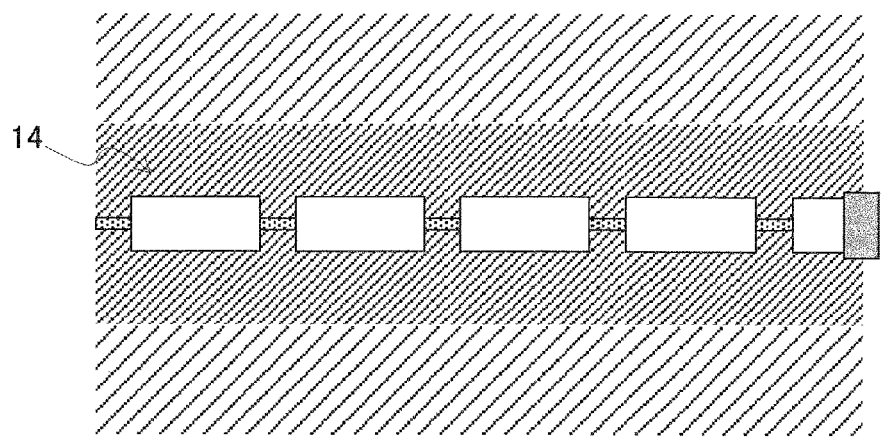
FIG. 4A is an illustrative view of an example of a distribution state of electromagnetic waves in an extending direction of the leaky coaxial cable and FIG. 4B an illustrative view of an example of a distribution state of electromagnetic waves in a radial direction of the leaky coaxial cable.
Figure 4B:
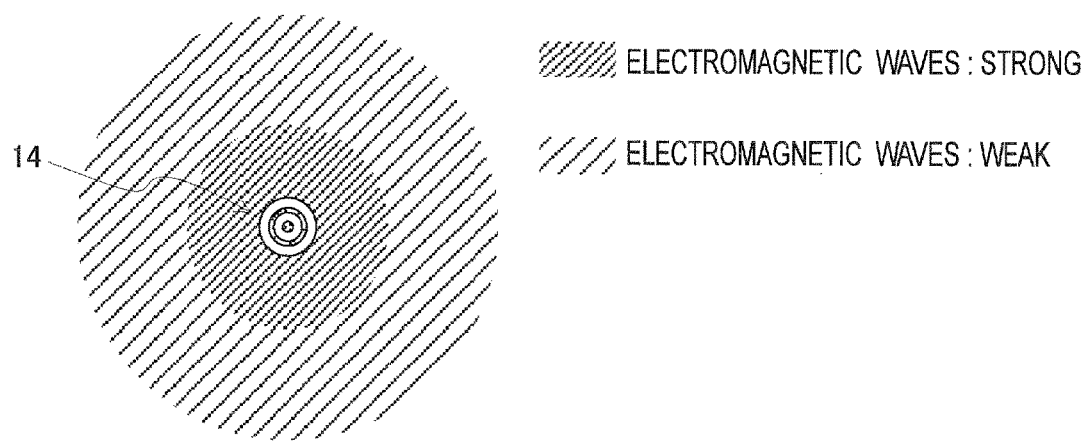

A portion of the high frequency signal propagating through the leaky coaxial cable 14 leaks from the missing portions 141ck as electromagnetic waves. As shown in FIGS. 4A and 4B, the leakage range of the electromagnetic waves covers the entire length of the leaky coaxial cable 14 in the extending direction of the leaky coaxial cable 14, while being limited to a periphery of the leaky coaxial cable 14 in the radial direction of the leaky coaxial cable 14. Therefore, the leaky coaxial cable 14 uses only an area close to a line defined by the cable as a radiation area.

In FIGS. 4A and 4B, a finely-hatched area is a strong electromagnetic field area (an area in which electromagnetic waves are strong) and a coarsely-hatched area is a weak electromagnetic field area (an area in which electromagnetic waves are weak).

When the direction perpendicular or substantially perpendicular to the line defined by the leaky coaxial cable 14 is at 0° and the terminator 14tm side is denoted by +θ and the power supply side is denoted by −θ, the electromagnetic waves are often radiated with an inclination in the +θ direction. However, since a plurality of radiation sources is present and arranged in accordance with the shape of the cable, the plane of polarization of the leaked electromagnetic waves is not fixed.

Figure 5:
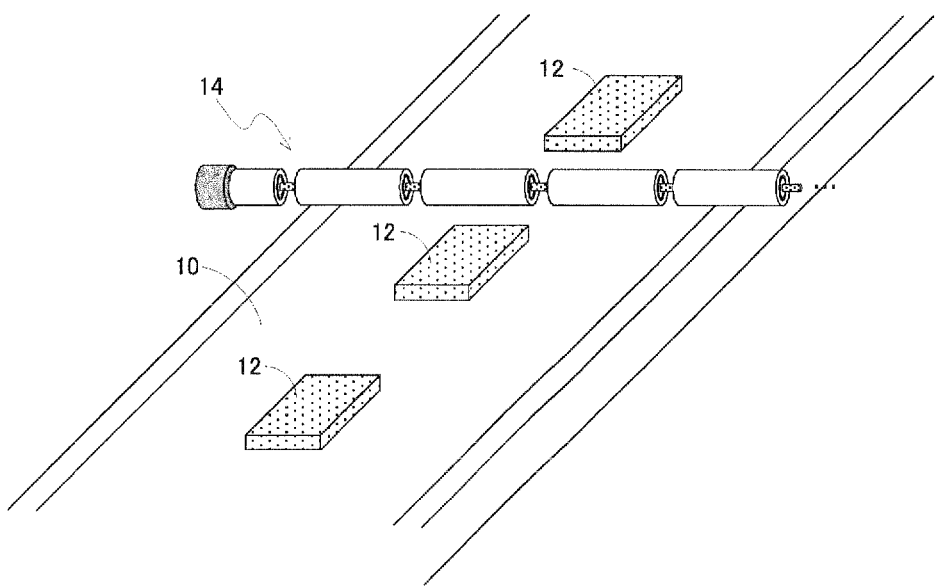
FIG. 5 is a perspective view of an example of a state in which the leaky coaxial cable is disposed above a belt on which the articles are conveyed.
Figure 6:
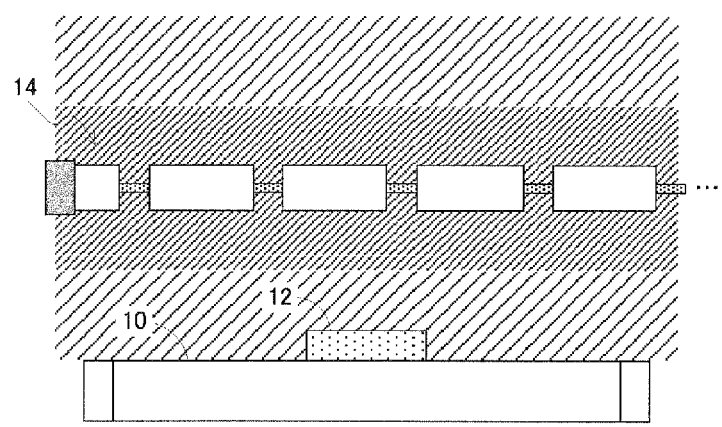
FIG. 6 is an illustrative view of an example of a positional relationship between the electromagnetic waves radiated from the leaky coaxial cable disposed as shown in FIG. 5 and the articles conveyed by the belt.

In this preferred embodiment, the leaky coaxial cable 14 preferably is prepared as a stationary RW antenna (preparation step) and is disposed above the conveyor belt 10 such that at least a portion (at least two positions) of the cable traverses the conveyor belt 10 (perpendicular or substantially perpendicularly intersects with the conveying direction of the articles 12) (disposition step). The RFID reader device is connected to a connector of the disposed leaky coaxial cable 14. The leaky coaxial cable 14 has a positional relationship shown in FIG. 5 with respect to the conveyor belt 10 conveying the articles 12. The electromagnetic waves radiated from the leaky coaxial cable 14 are distributed as shown in FIG. 6, and the RFID tag 16 attached to the article 12 is activated based on the radiated electromagnetic waves. The activated RFID tag 16 radiates a high frequency signal (electromagnetic waves) representative of its own tag information (ID information). The radiated high frequency signal is applied through the leaky coaxial cable 14 to the RFID reader device and, as a result, the tag information is read by the RFID reader device.

As can be seen from the above description, the leaky coaxial cable 14, i.e., the traveling-wave cable antenna, uses only the area close to the line defined by the cable as a readable area. Additionally, the plane of polarization of the electromagnetic waves radiated by the leaky coaxial cable 14 is not fixed. By disposing the one leaky coaxial cable 14 having the characteristics as described above such that at least a portion (at least two positions) of the cable traverses the conveyor belt 10, information is able to be accurately read from the RFID tag 16 while interference with other adjacently-provided RFID systems, etc., is prevented by use of a compact and simple configuration. Particularly, the absence of occurrence of an interference problem between multiple antennas eliminates the need for a complicated control circuit to control the antennas etc., so that the RFID system is able to have a simple structure.

Second Preferred Embodiment

Figure 7:
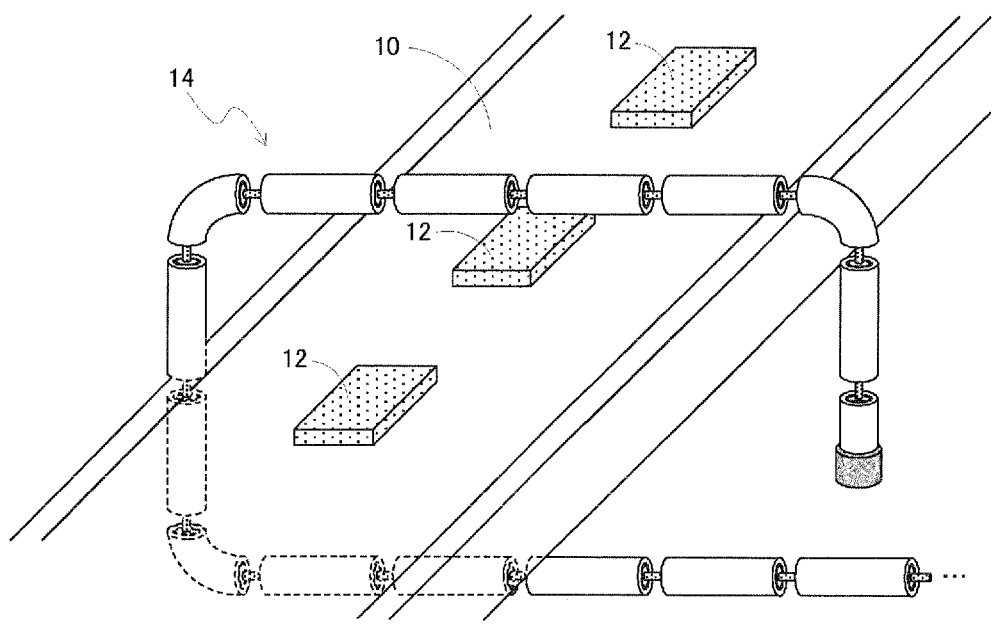
FIG. 7 is a perspective view of an example of a state in which the leaky coaxial cable is disposed to surround the belt on which the articles are conveyed.

Referring to FIG. 7, in an RFID system according to another preferred embodiment of the present invention, the leaky coaxial cable 14 is prepared as a stationary RW antenna (preparation step) and is disposed such that at least a portion (at least two positions) of the cable traverses the conveyor belt 10 (disposition step). The RFID reader device not shown is connected to a connector of the disposed leaky coaxial cable 14. The RFID tags 16 attached to the articles 12 are activated based on the electromagnetic waves radiated from the leaky coaxial cable 14 and radiate high frequency signals (electromagnetic waves) representative of its own tag information. The radiated high frequency signals are applied through the leaky coaxial cable 14 to the RFID reader device and, as a result, the tag information is read by the RFID reader device.

Figure 8:
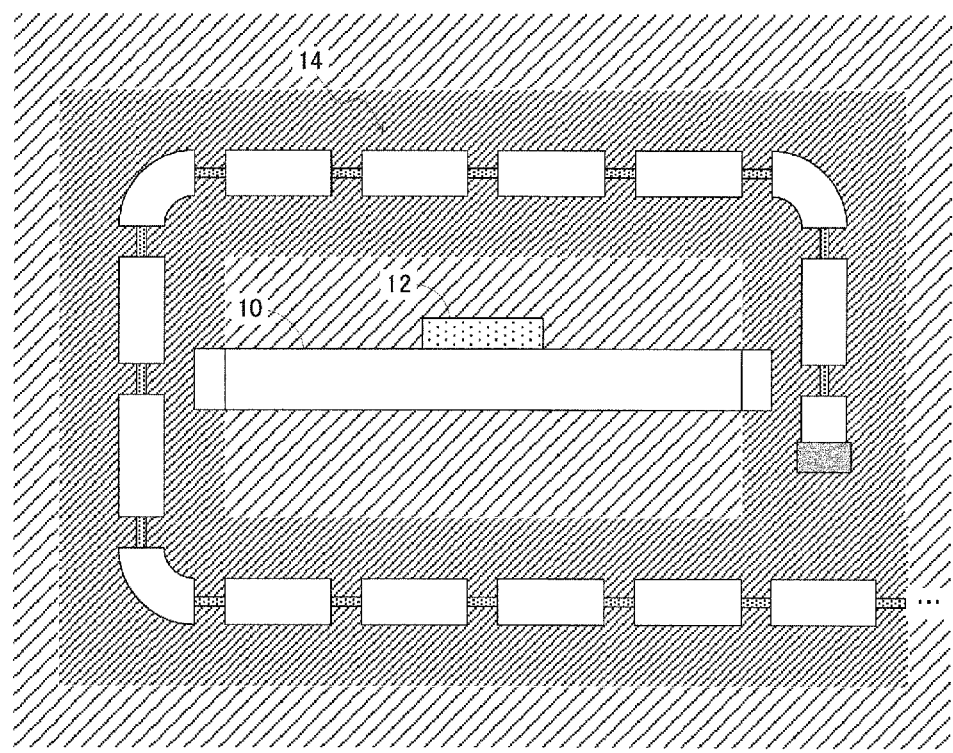
FIG. 8 is an illustrative view of an example of a positional relationship between the electromagnetic waves radiated from the leakage coaxial cable arranged as shown in FIG. 7 and the articles conveyed by the belt.

However, the leaky coaxial cable 14 wraps around the periphery of the conveyor belt 10 (to surround the conveyor belt 10). Therefore, the electromagnetic waves radiated from the leaky coaxial cable 14 are distributed as shown in FIG. 8. By disposing the leaky coaxial cable 14 in this way, sufficient radiation characteristics are able to be ensured even in a side portion of the conveyor belt 10 so as to avoid occurrence of an omission or error in the reading of the tag information. Since the articles 12 pass through an inside of a loop defined by the leaky coaxial cable 14, even if the output of the leaky coaxial cable 14 is reduced, the information is able to be accurately read from the RFID tags 16.

Third Preferred Embodiment

Figure 9:
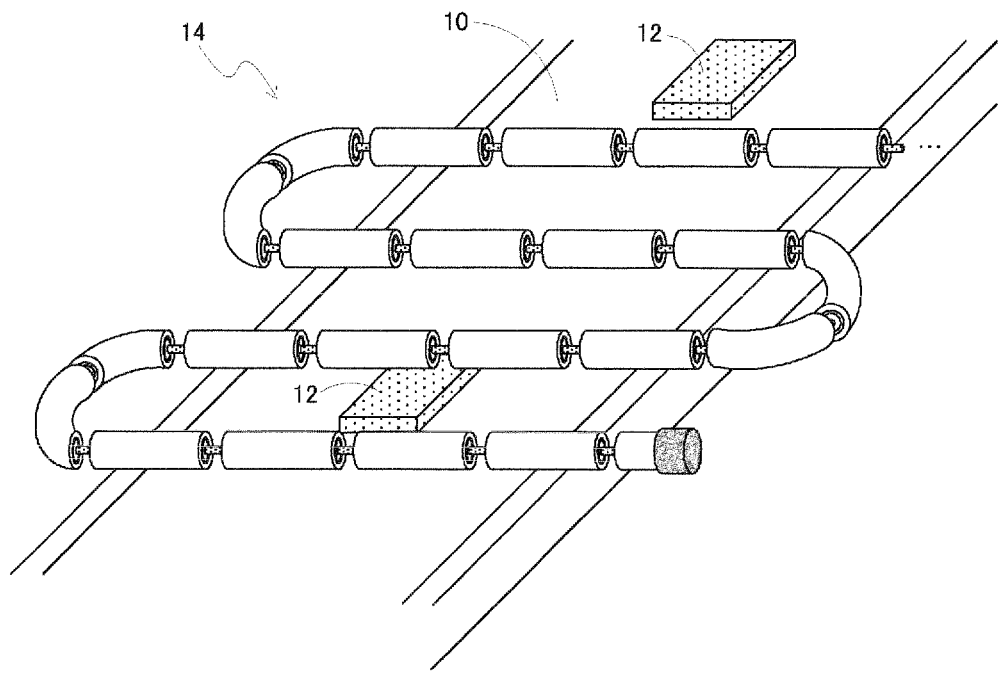
FIG. 9 is a perspective view of an example of a state in which the leaky coaxial cable is disposed to meander above the belt on which the articles are conveyed.

Referring to FIG. 9, in an RFID system according to a further preferred embodiment of the present invention, the leaky coaxial cable 14 is prepared as a stationary RW antenna (preparation step) and is disposed such that at least a portion (at least two positions) of the cable traverses the conveyor belt 10 (disposition step). The RFID reader device not shown is connected to a connector of the disposed leaky coaxial cable 14. The RFID tags 16 attached to the articles 12 are activated based on the electromagnetic waves radiated from the leaky coaxial cable 14 and radiate high frequency signals (electromagnetic waves) representative of its own tag information. The RFID reader device loads the radiated high frequency signals through the leaky coaxial cable 14 and reads the information of the RFID tag 16.

The leaky coaxial cable 14 is disposed above the conveyor belt 10 so as to meander (in a wave shape or a meander shape) with respect to the conveying direction of the articles 12. Therefore, the leaky coaxial cable 14 traverses the conveyor belt 10 a plurality of times.

Additionally, the leaky coaxial cable 14 is disposed such that the leading end portion side thereof is located downstream in the conveying direction of the articles 12. The leaky coaxial cable 14, i.e., the traveling-wave cable antenna, exhibits a relatively large electromagnetic field strength near the leading end. Therefore, an omission or error in reading is able to be more easily prevented by disposing the traveling-wave cable antenna with the connection end for the RFID reader device located on the upstream side in the conveying direction and the leading end portion located on the downstream side in the conveying direction.

Figure 10:
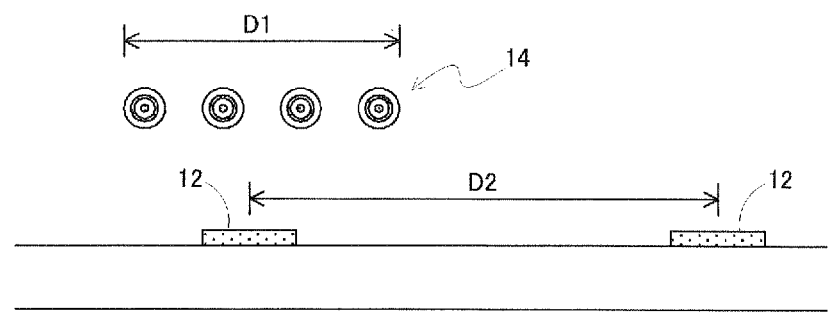
FIG. 10 is an illustrative view of an example of a positional relationship between the leaky coaxial cable disposed as shown in FIG. 9 and the articles conveyed on the belt.

Moreover, when the distribution range of the leaky coaxial cable 14 in the conveying direction has the length of "D1", the articles 12 are conveyed at intervals of a length D2 sufficiently longer than the length D1 (see FIG. 10). This enables the avoidance of an occurrence of an omission in reading of the tag information as well as the avoidance of erroneous reading of the tag information of the different article 12. However, in some cases, the RFID reader device is able to collectively and distinguishably read tag information of a plurality of the articles 12, 12, . . . , and in such a case, a plurality of the articles 12 may be conveyed closely to each other.

Fourth Preferred Embodiment

Figure 11:
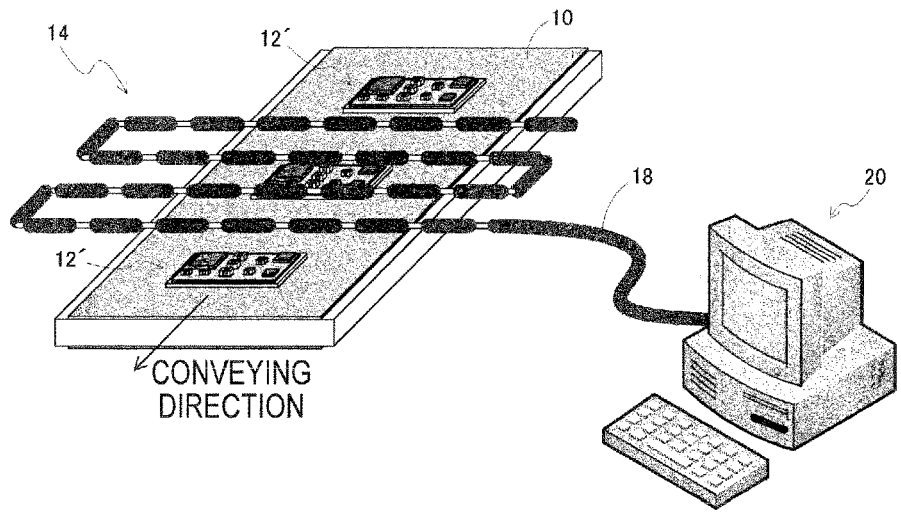
FIG. 11 is an illustrative view of an RFID system according to another preferred embodiment of the present invention.

Referring to FIG. 11, in an RFID system according to a yet further preferred embodiment of the present invention, the leaky coaxial cable 14 is prepared as a stationary RW antenna (preparation step) and is disposed such that at least a portion (at least two positions) of the cable traverses the conveyor belt 10 (disposition step). The connector (connection end) of the disposed leaky coaxial cable 14 is connected through a leading coaxial cable 18 to a terminal device 20.

Figure 12:
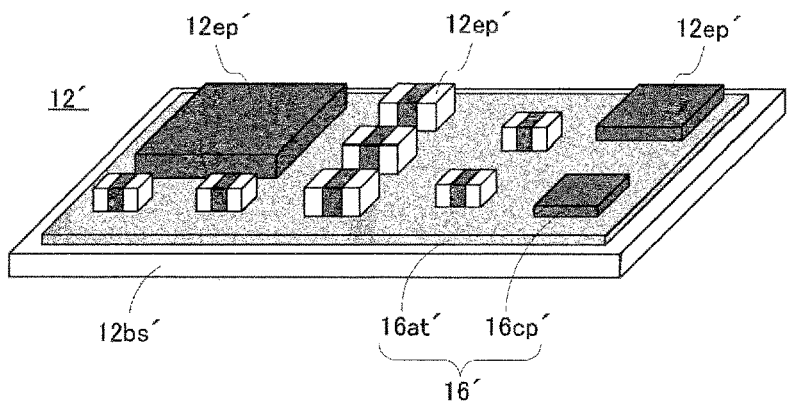
FIG. 12 is an illustrative view of another example of an article and an RFID tag embedded in the article.

Each of articles 12' placed on the conveyor belt 10 is configured as shown in FIG. 12. A plate-shaped ground electrode is provided on an upper surface of a substrate 12bs' as an antenna element 16at' that is a radiator. The substrate 12bs' is preferably made of polychlorinated biphenyl, for example. On an upper surface of the antenna element 16at', an RFIC element 16cp' is mounted along with a plurality of electronic components 12ep', 12ep', . . . . The RFID tag 16' preferably includes the RFIC element 16cp' and the antenna element 16at.

The RFID tags 16' attached to the articles 12' are activated based on the electromagnetic waves radiated from the leaky coaxial cable 14 and radiate high frequency signals (electromagnetic waves) representative of its own tag information. The radiated high frequency signals are applied through the leaky coaxial cable 14 and the leading coaxial cable 18 to the terminal device 20. The terminal device 20 includes an R/W main body built-in and the tag information is read by the R/W main body.

Also in this preferred embodiment, the leaky coaxial cable 14, i.e., the traveling-wave cable antenna, uses only the area close to the line defined by the cable as a readable area. Additionally, the plane of polarization of the electromagnetic waves radiated by the leaky coaxial cable 14 is not fixed. The one leaky coaxial cable 14 having such characteristics is disposed above the conveyor belt 10, meandering with respect to the conveying direction of the articles 12'.

As a result, information is able to be accurately read from the RFID tags 16' while interference with other adjacently-provided RFID systems, etc., is prevented by use of a compact and simple configuration. Particularly, the absence of occurrence of an interference problem between multiple antennas eliminates the need for a complicated control circuit to control the antennas, etc., so that the RFID system is able to have a simple structure.

Fifth Preferred Embodiment

Figure 13:
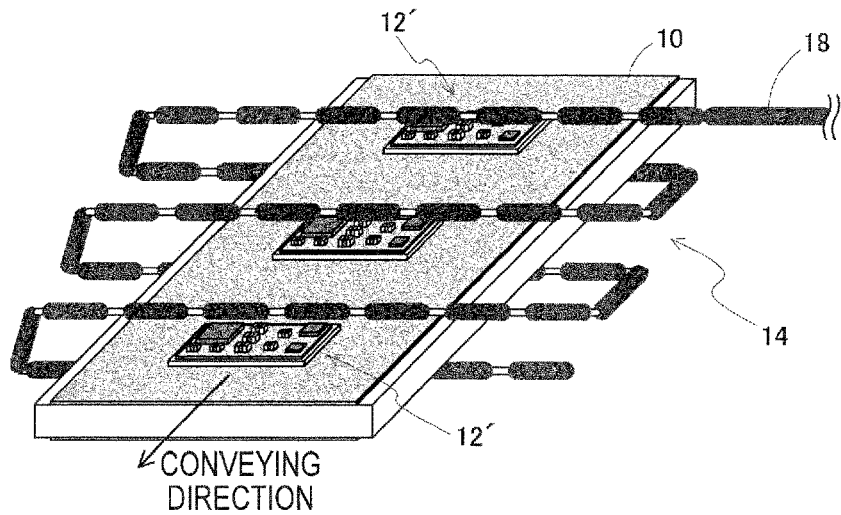
FIG. 13 is an illustrative view of a portion of an RFID system according to a further preferred embodiment of the present invention.

Referring to FIG. 13, an RFID system according to another preferred embodiment of the present invention is the same as the RFID system shown in FIG. 11 except that the leaky coaxial cable 14 is helically wound around a conveyance path including the conveyor belt 10 and that the leading end portion side is located downstream along the conveying direction of the articles 12'.

Also when the leaky coaxial cable 14 is helically disposed, the RFID tags 16' attached to the articles 12' are able to be reliably read as is the case with the meandering arrangement shown in FIG. 11. Since the leaky coaxial cable 14 is flexible, such a configuration is able to be easily achieved.

Since the leaky coaxial cable 14 exhibits a relatively large electromagnetic field strength near the leading end, an omission or error in reading is able to be more easily prevented by disposing the leaky coaxial cable 14 with the connection end for the terminal device located on the upstream side in the conveying direction and the leading end portion located on the downstream side in the conveying direction.

Sixth Preferred Embodiment

Figure 14:
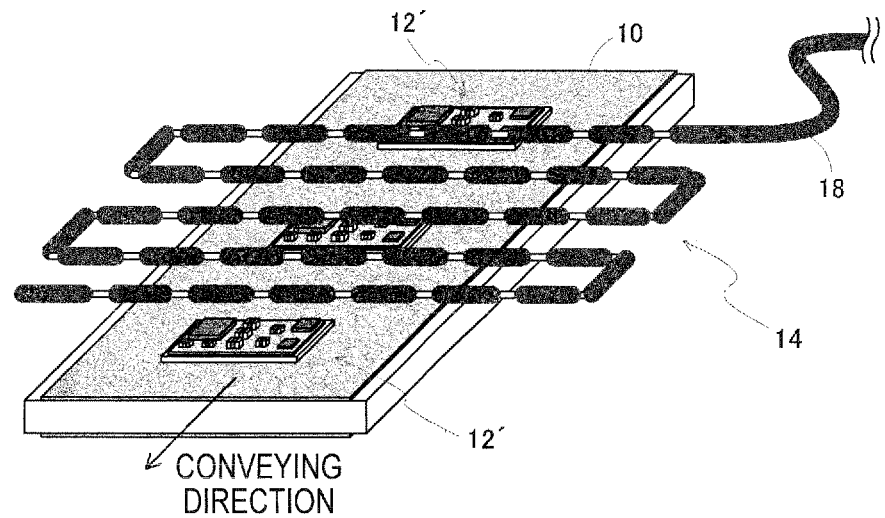
FIG. 14 is an illustrative view of a portion of an RFID system according to a yet further preferred embodiment of the present invention.
Figure 15:
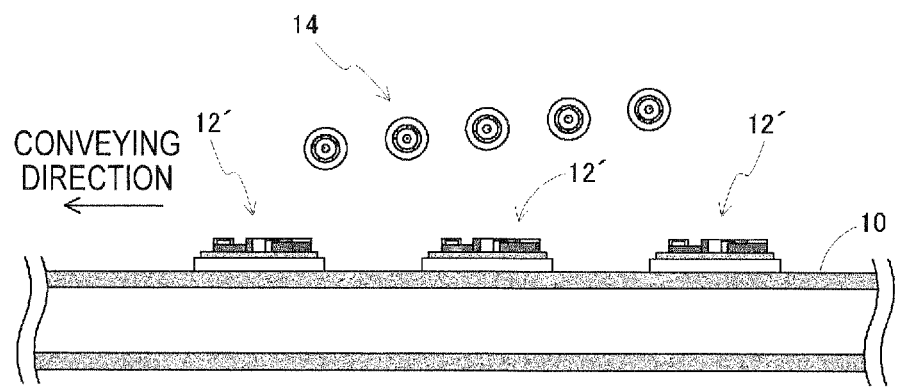
FIG. 15 is an illustrative view of an example of a positional relationship between the leaky coaxial cable and the articles conveyed on the belt.

Referring to FIGS. 14 and 15, an RFID system according to a further preferred embodiment of the present invention is the same as the RFID system shown in FIG. 11 except that the leading end portion side of the leaky coaxial cable 14 is located downstream along the conveying direction of the articles 12' and that a distance from the leading end portion to the conveyor belt 10 is shorter than a distance from the connection end for the terminal device to the conveyor belt 10 when viewed from the side.

Since the leaky coaxial cable 14 exhibits a relatively large electromagnetic field strength near the leading end, an omission or error in reading is able to be more easily prevented by bringing the leaky coaxial cable 14 closer to the articles 12' on the downstream side as compared to the upstream side in the conveying direction. The distance from the leaky coaxial cable 14 to the conveyor belt 10 may continuously be reduced as shown in FIG. 15, or may be reduced in stages.

Although the leaky coaxial cable 14 is preferably included in the above-described preferred embodiments of the present invention, any cable or antenna other than the leaky coaxial cable 14 may be used as long as the cable or antenna functions as a cable-shaped traveling-wave antenna. The RFID-tagged article is not limited to a printed wiring board, and various tagged articles can be used, including a luggage box to which an RFID tag is affixed, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for reading information comprising:
reading information from an RFID tag attached to an article conveyed in one direction by a conveyor belt of a conveyor platform by using a stationary read-write antenna located in a vicinity of the conveyor platform, the stationary read-write antenna being a cable-shaped antenna; and
during the reading, locating the cable-shaped antenna such that at least a first portion of the cable-shaped antenna and a second portion of the cable-shaped antenna traverse a conveying direction of the article so as to read information from the RFID tag by using an electromagnetic field around the cable-shaped antenna; wherein
a traversing position of the first portion of the cable-shaped antenna is different from a traversing position of the second portion of the cable-shaped antenna in the conveying direction of the article; and
the cable-shaped antenna is helically wound around a conveyance path including the conveyor belt, and the cable-shaped antenna extends above the article and below the conveyor platform in a direction perpendicular or substantially perpendicular to the conveying direction of the article.

2. The method according to claim 1, wherein the locating is performed such that a leading end portion side of the cable-shaped antenna is located downstream along the conveying direction of the article.

3. The method according to claim 1, wherein the locating is performed such that a downstream side of the cable-shaped antenna is brought closer to the article as compared to an upstream side along the conveying direction of the article.

4. The method according to claim 1, wherein the cable-shaped antenna is a leaky coaxial cable.

5. The method according to claim 4, wherein the leaky coaxial cable includes a center conductor, an insulator, an outer conductor and a sheath, and the center conductor is exposed to outside at portions along a length of the leaky coaxial cable.

6. The method according to claim 5, wherein the center conductor is disposed continuously along an entire length of the leaky coaxial cable, and each of the insulator, the outer conductor and the sheath are disposed discontinuously along the entire length of the leaky coaxial cable to define missing portions such that a signal propagating through the leaky coaxial cable is leaked from the missing portions to outside.

7. The method according to claim 1, further comprising conveying a plurality of articles together such that the stationary read-write antenna reads the information of each of the plurality of articles.

8. An RFID system comprising:
- a conveyor platform including a conveyor belt and conveying an article to which an RFID tag is attached in one direction; and
- a stationary read-write antenna in a vicinity of the conveyor platform to read information from the RFID tag attached to the article; wherein
- the stationary read-write antenna is a cable-shaped antenna;
- at least a first portion of the cable-shaped antenna and a second portion of the cable-shaped antenna traverse a conveying direction of the article;
- a traversing position of the first portion of the cable-shaped antenna is different from a traversing position of the second portion of the cable-shaped antenna in the conveying direction of the article;
- the cable-shaped antenna is helically wound around a conveyance path including the conveyor belt, and the cable-shaped antenna extends above the article and below the conveyor platform in a direction perpendicular or substantially perpendicular to the conveying direction of the article.

9. The RFID system according to claim 8, wherein a leading end portion side of the cable-shaped antenna is located downstream along the conveying direction of the article.

10. The RFID system according to claim 8, wherein a downstream side of the cable-shaped antenna is brought closer to the article as compared to an upstream side along the conveying direction of the article.

11. The RFID system according to claim 8, wherein the cable-shaped antenna is a leaky coaxial cable.

12. The RFID system according to claim 11, wherein the leaky coaxial cable includes a center conductor, an insulator, an outer conductor and a sheath, and the center conductor is exposed to outside at portions along a length of the leaky coaxial cable.

13. The RFID system according to claim 12, wherein the center conductor is disposed continuously along an entire length of the leaky coaxial cable, and each of the insulator, the outer conductor and the sheath are disposed discontinuously along the entire length of the leaky coaxial cable to define missing portions such that a signal propagating through the leaky coaxial cable is leaked from the missing portions to outside.

14. The RFID system according to claim 8, wherein the stationary read-write antenna reads the information of each of a plurality of articles conveyed together.

\* \* \* \* \*